United States Patent [19]
Gearin

[11] 3,716,786
[45] Feb. 13, 1973

[54] MODULE TESTER AND SORTER FOR USE IN A MODULE TEST SYSTEM

[75] Inventor: John M. Gearin, Brookfield, Conn.

[73] Assignee: Cogar Corporation, Wappingers Falls, N.Y.

[22] Filed: Oct. 2, 1970

[21] Appl. No.: 77,454

[52] U.S. Cl. ............324/158 F, 209/81, 324/73 AT
[51] Int. Cl. ....................G01r 31/22, G01r 15/12
[58] Field of Search .324/73 AT, 73 R, 158 R, 158 F; 209/75, 74, 81

[56] References Cited

UNITED STATES PATENTS

| | | | |
|---|---|---|---|
| 3,094,212 | 6/1963 | Moore et al. | 324/73 R |
| 3,380,586 | 4/1968 | Frobese et al. | 209/74 R |
| 3,587,852 | 6/1971 | Kamm | 209/81 R |

Primary Examiner—Rudolph V. Rolinec
Assistant Examiner—Ernest F. Karlsen
Attorney—Harry M. Weiss and Amster & Rothstein

[57] ABSTRACT

A module tester and sorter for determining the electrical characteristics of each of a series of memory modules. If the module has certain characteristics, it is transported by an index wheel to a designated loading bin. If the module has other characteristics, it is transported through the wheel into a different loading bin. A probe is included in the unit and has an array of contact fingers which as a group are shiftable in a direction transverse of the pins for a position which does not interfere with movement of the modules to a position engaging the module pins to make electrical contact for the purpose of testing the module circuit.

7 Claims, 14 Drawing Figures

INVENTOR
JOHN M. GEARIN

BY Amster & Rothstein
Harry M Weiss
ATTORNEYS

MODULE TESTER AND SORTER FOR USE IN A MODULE TEST SYSTEM

This invention relates to a tester and sorter for memory modules for use in a module test system.

The construction and use of memory modules especially of the integrated circuit type are well-known in the art. As the production and use of memory and other modules increases in volume and becomes of more significance to the electronic industry, as well as to all other fields of technology which the electronic industry serves, it has become apparent that the modules must be tested before they are shipped, by fully automated techniques.

Testers capable of determining that integrated circuits of modules meet predetermined standards are available in the market place, for example, those manufactured by The Redcor Corporation of Canoga Park, California. However, there does not yet exist any fully automated equipment for interfacing or connecting the modules to such a tester on a continuous automated basis. To date, the interfacing step has been carried out by hand, with workers taking individual modules and manually inserting them one at a time into a socket coupled to test equipment. Some sort of visual display is usually provided so that the worker can be given a signal indicating whether the individual module under test meets certain standards or not. If the module does meet these standards, the worker disconnects the module from the socket and puts it into one tray. On the other hand, if the module does not meet these standards, the worker places it into a different tray. It is apparent that the aforesaid testing procedure, in which each module is individually handled by a worker, is time-consuming and creates burdensome labor costs.

The testing of modules in this way has additional difficulties. The modules are relatively small in size and delicate, so that their handling by a worker is not desirable. Next, the pins of the module are formed of lightweight thin wire stock, so that any significant sideways force applied to them causes them to be sprung out of their original alignment, rendering the further use of such modules difficult. Thus, there has arisen a need for a system for testing and sorting modules which is carried out on a fully automated basis, which has the capability of depositing the modules into two or more bins according to the test results, and which in effecting the foregoing aims, handles the modules without misaligning the module pins.

Accordingly, it is the primary object of the present invention to provide a module tester and sorter for use in a module test system which is fully automated, that is, which connects each module of a series of modules on an individual basis to a tester, and which thereupon sorts the modules into two or more groups, depending upon the test results.

It is a further object of the present invention to provide a module tester and sorter of the type described which includes a probe assembly with an array of contact fingers, with the assembly arranged to move the fingers into contact with the pins of the module in a manner such that bending of the pins is prevented.

In general, and in accordance with the teaching of the present invention, there is provided a module tester and sorter which includes a movable frame, at the top of which are loaded a group of modules for testing purposes. The modules slide down a chute to a testing station at which further movement is prevented by a stop. At the testing station, each module is received in a furrowed, ridged guideway. A probe assembly coupled to a circuit tester of a known type is situated at the testing station and includes an array of contact fingers, each adapted to contact a different pin of a module under test.

At the testing station, the pins of the module under test are situated in the furrows of the guideway and the fingers of the probe assembly are located initially in wells in these ridges of the guideway, being positioned so as not to interfere with movement of the module along the guideway. The fingers are shiftable in a direction transverse of the pins to a position out of the wells and into contact with the module pins so that the test equipment is connected via the fingers to the pins for testing purposes. The finger-to-pin contact is made in a manner that the module is set up under zero-insertion force.

The module, after testing, is released and the next module in line moves to the testing station. The module which has left the testing station slides down a chute to a sorting station, from which it is transported into one of two or more bins for sorting purposes, in accordance with the test results. At the sorting station, the module passes into one bucket of a circumferentially-disposed set of buckets on an index wheel. If the module has certain test results, a signal from the tester keeps the index wheel bucket open, permitting the module to pass through it and into a first bin. If a different signal is sent from the tester, the bucket is closed and the module remains in it. The index wheel now rotates through a limited arc, placing an empty bucket into alignment with the chute of the sorting station. This process continues until the first module to remain within a bucket reaches a position in alignment with a second bin, whereupon the bucket is opened to discharge the module. Thus, the first bin will have received modules which meet one standard, for example, those which pass certain tests, and the second bin will have received modules of a different standard, for example, modules which are defective.

Other objects, features, and embodiments of the present invention are contemplated and will be apparent from the following more detailed description with reference to the accompanying drawings, wherein.

Figure 1:
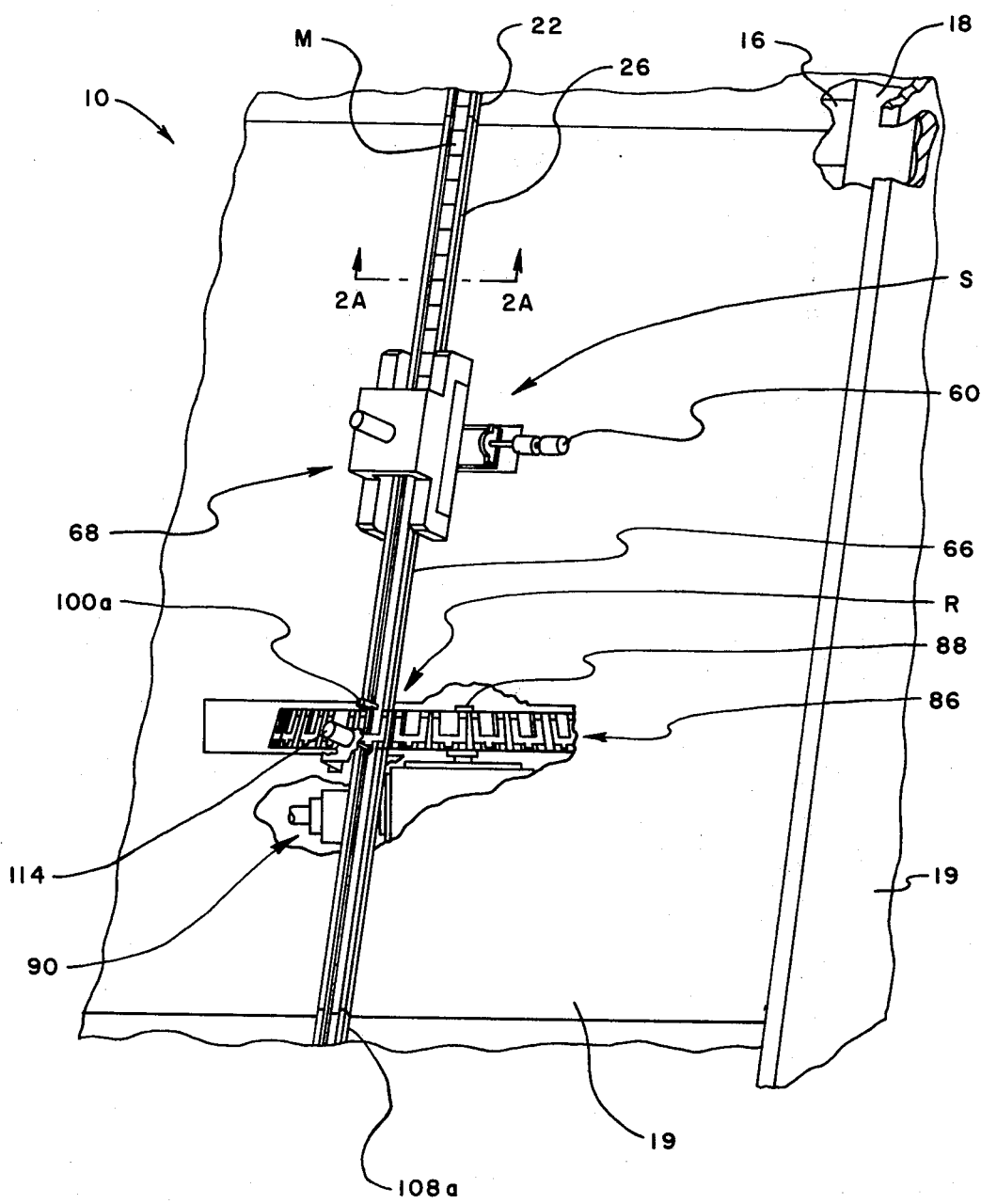
FIG. 1 is a fragmentary front perspective view of the module tester and sorter.
Figure 2:
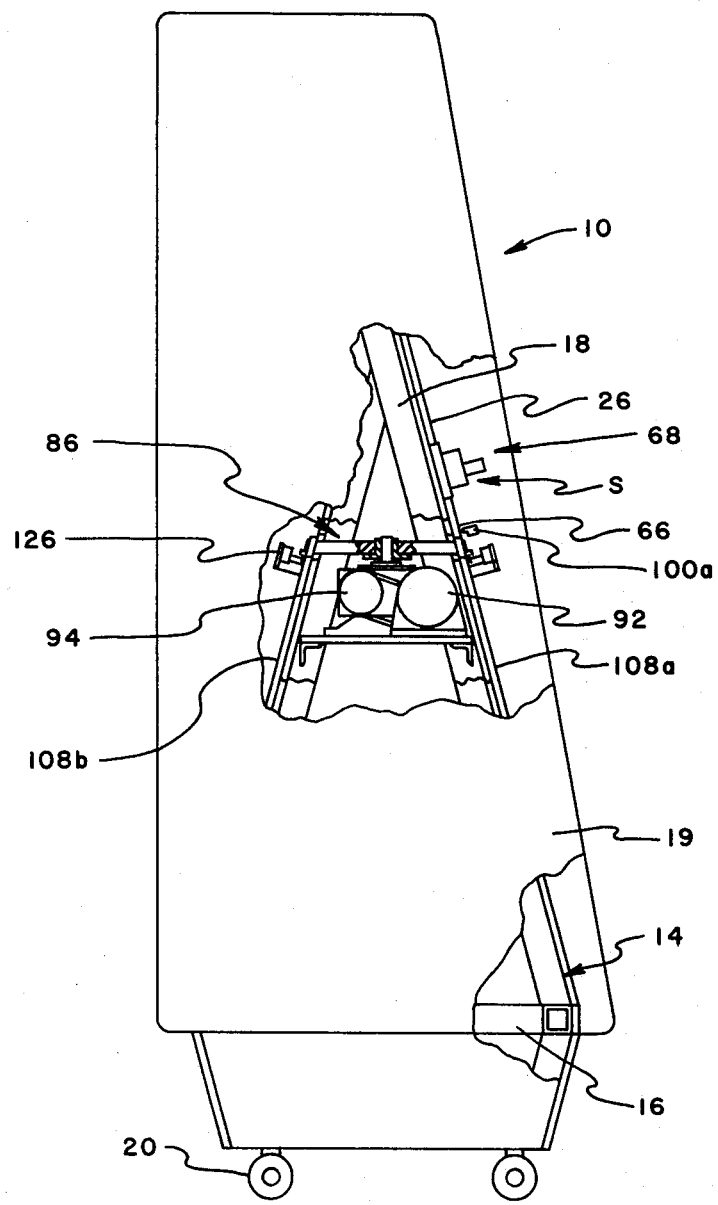
FIG. 2 is a side elevational view of the module tester and sorter.

Referring now in detail to the drawings, and especially FIGS. 1 and 2, there is shown a module tester and sorter apparatus 10 for use in a module test system. The module sorter includes a frame 14, including a number of interconnected generally horizontal frame members 16, and a number of generally vertical frame members 18 to which panels 19 and other components of the apparatus are fixed. The frame 14 is mounted on wheels 20 for mobility.

Figure 2A:
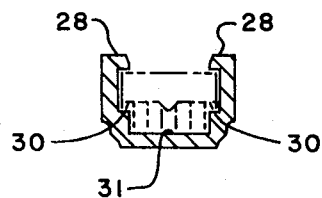
FIG. 2A is an enlarged cross-sectional view of a module chute, taken substantially along the line 2A—2A of FIG. 1.

A downwardly-inclined loading chute 22, which holds modules M to be tested, is located on the frame 14 at an upper portion thereof, and is supported by the frame members 16, 18. Means transports the modules M from the loading chute 22 to a testing station S, so that the modules may be tested one at a time, both continuously and successively. Said transporting means includes a downwardly-inclined entry chute 26. The chute 26 has an internal configuration (see FIG. 2A) such that the modules are guided downwardly without being able to jump out of the chute, while at the same time the pins of the module are protected from accidental and possibly harmful contact with portions of the chute. For this purpose, the chute has a pair of opposed longitudinally extending overhanging lips 28 running the length of the chute, which prevent the module from leaving the chute once the module has entered it, and a pair of opposed longitudinally extending rails 30 on which the module cover rides. The rails 30 have a height such that the module pins do not drag on the floor 31 of the chute. The chute sides captivate the module laterally and prevent the pins from contacting the walls.

The transporting means further includes a stop 32 situated immediately below the testing station S (see FIGS. 3 and 4), which projects into the chute toward the floor 31 so that a module which has reached the testing station S cannot slide further downwardly.

Figure 3:
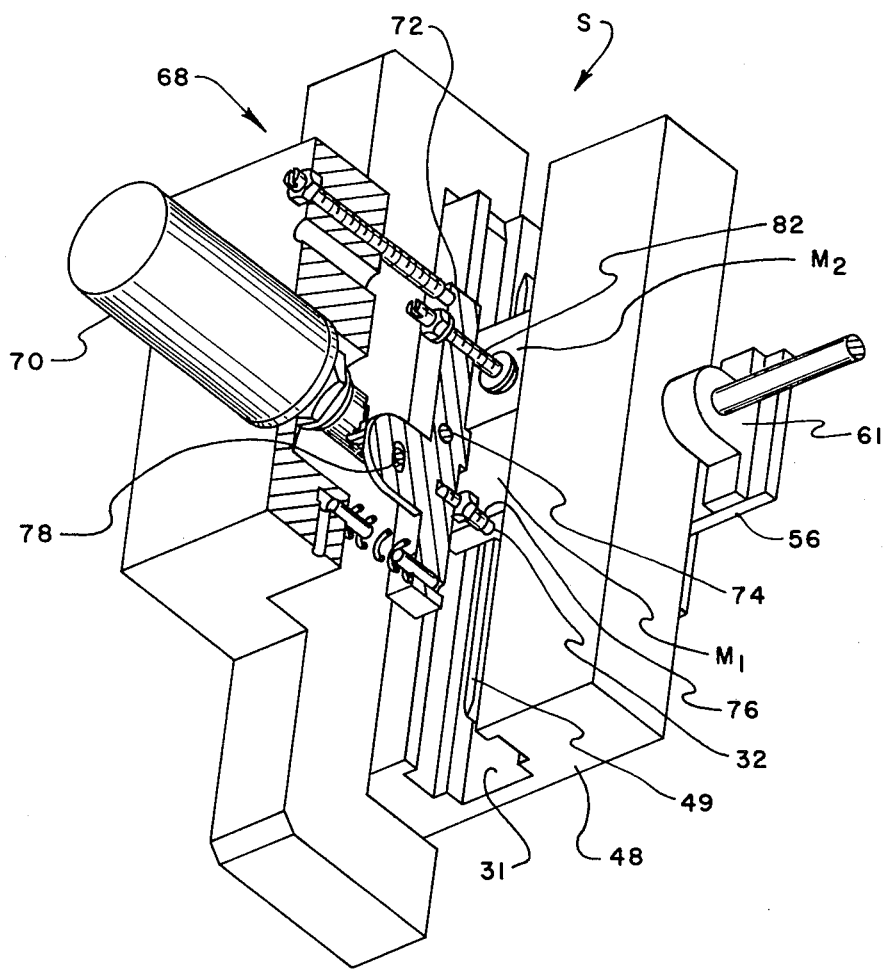
FIG. 3 is a front perspective view of the testing station of the apparatus.
Figure 4:
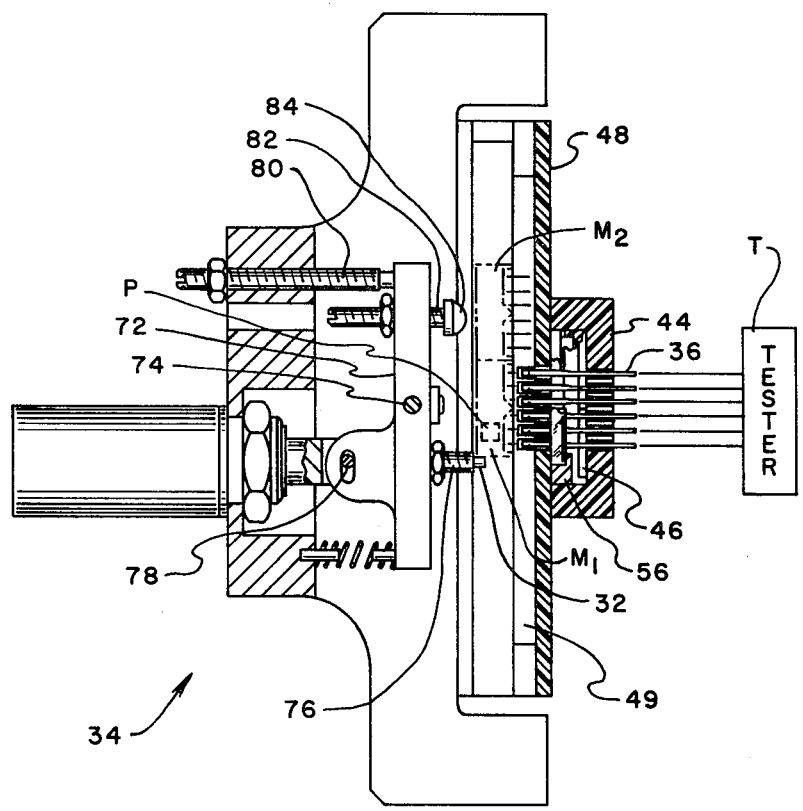
FIG. 4 is a cross-sectional view of the probe assembly of the apparatus.
Figure 5:
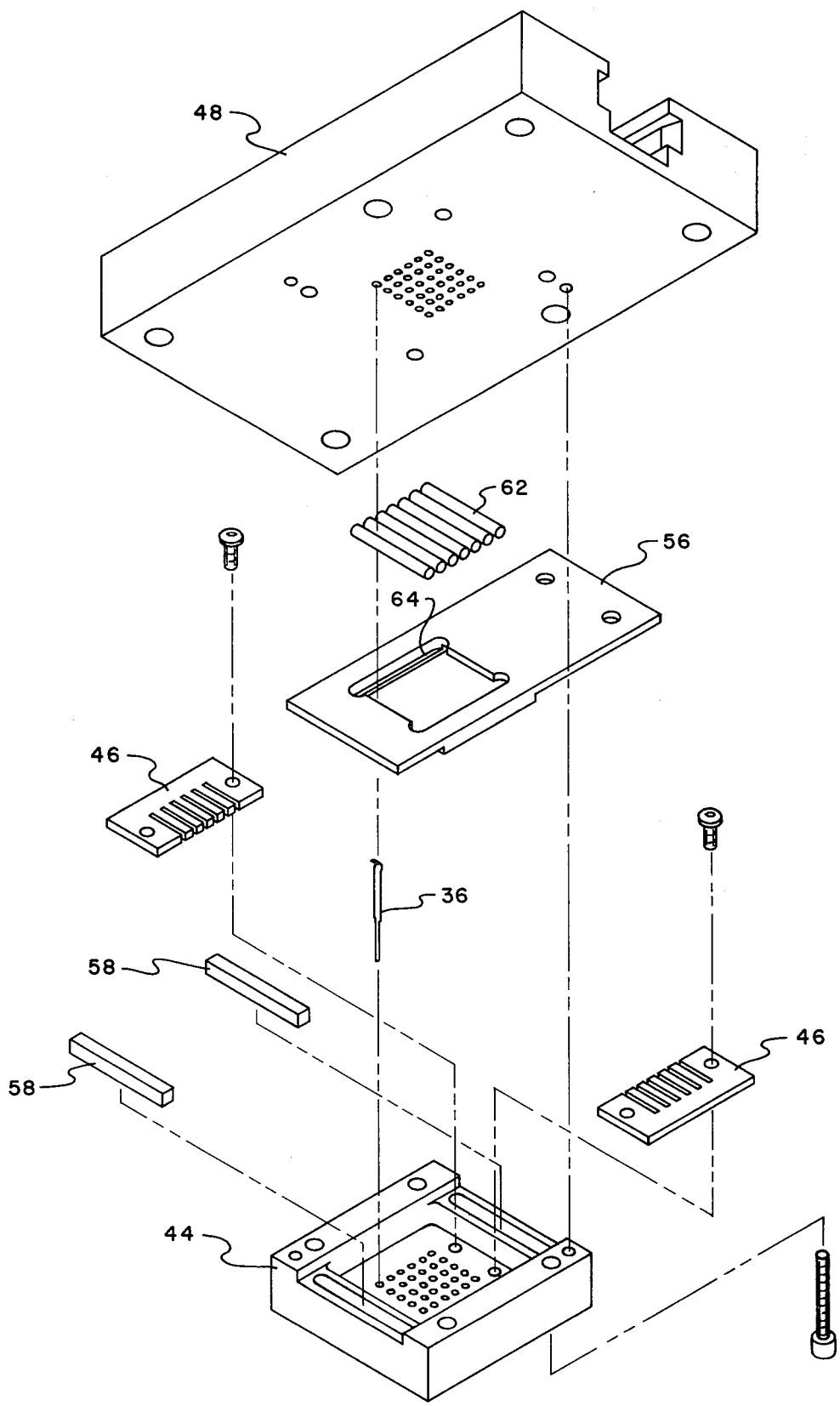
FIG. 5 is an exploded view of the shifting mechanism of the probe assembly.
Figure 6:
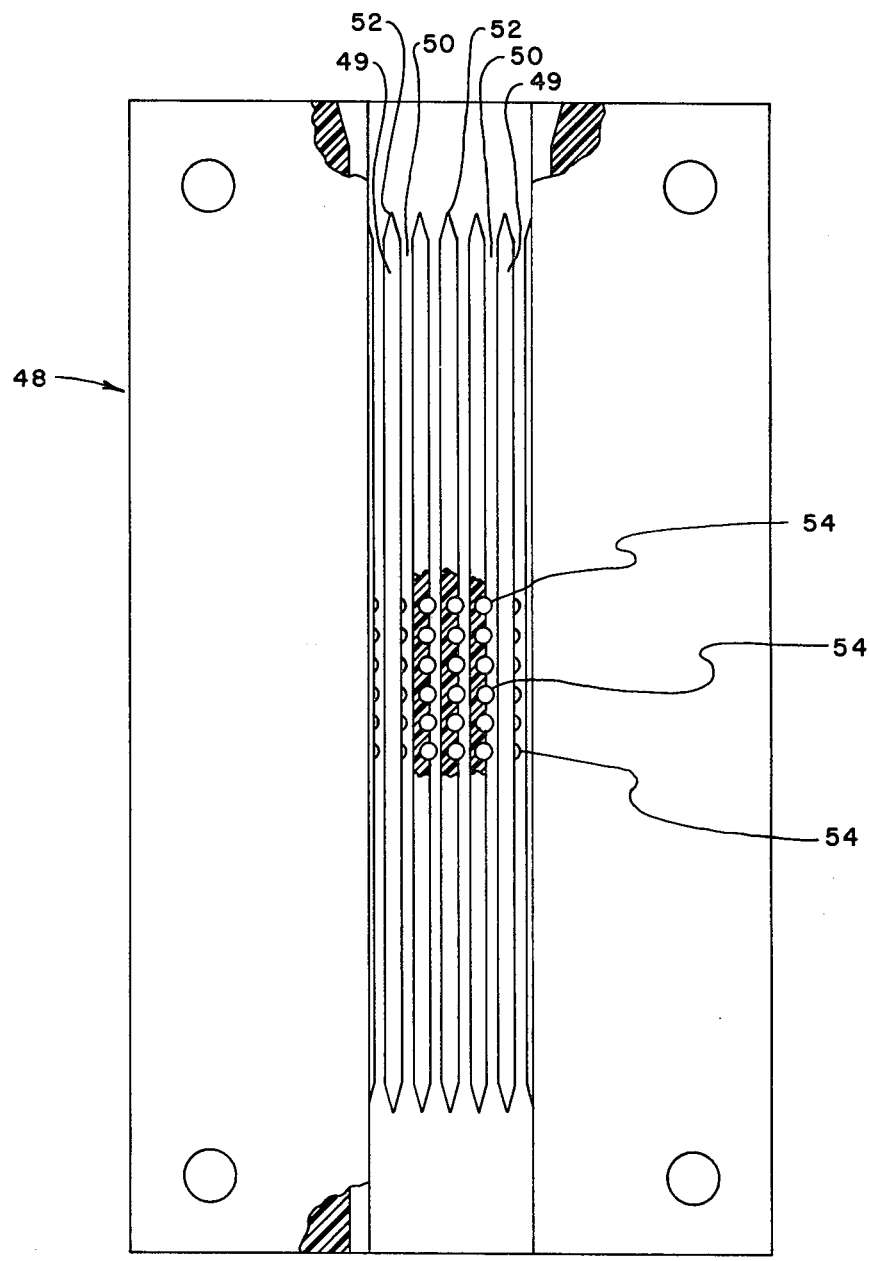
FIG. 6 is an enlarged front plan view of the guideway at the testing station.

A probe assembly 34 which includes an array of contact fingers 36 is located at the testing station S and is mounted on the frame 14 (see FIGS. 3-5). The contact fingers 36 are electrically connected to a circuit tester of any well-known type.

Figure 7:
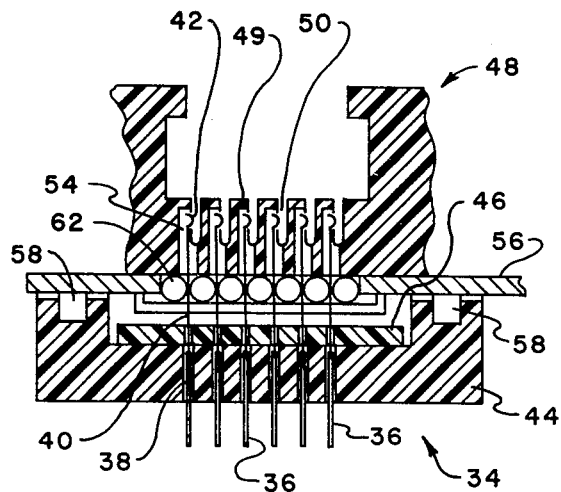
FIGS. 7, 8 and 9 are cross-sectional views of the probe assembly showing the fingers thereof in their "initial", "non-contact" and "contact" positions, respectively.
Figure 8:
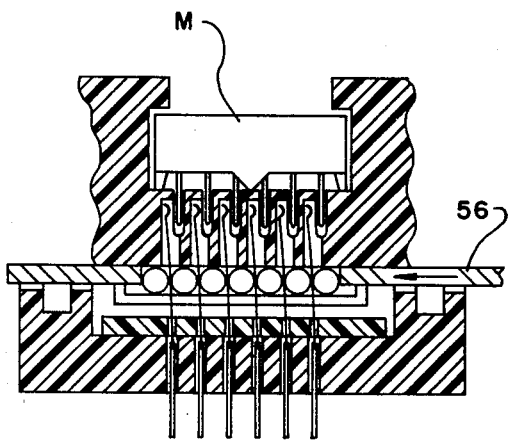
Figure 9:
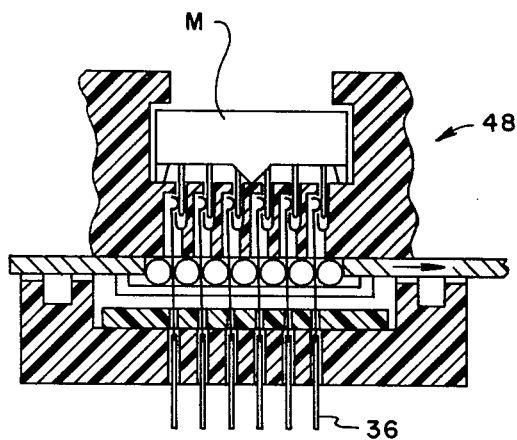

The probe assembly 34 in general shifts the contact fingers from a withdrawn position into contact with the pins of the module in a manner such that good electrical connections are made, while preventing any bending of the module pins which would cause misalignment of the same. To this end, the array of fingers 36 includes a plurality of such fingers arranged in parallel ranks and files, there being the same number of fingers as the number of pins which a module could carry. Typically, there are 36 pins carried by such modules, and accordingly there are 36 fingers. Obviously, the configuration and orientation of the array of fingers is complementary with the configuration and array of the pins of the modules. As will best be seen in FIGS. 7—9, each finger includes a base section 38, an intermediate section 40 which is flattened in order to ensure contact in the event there is a misalignment of the finger with respect to the pin, and a tip 42 having the configuration of a hook, which is the portion of the contact finger which comes into physical contact with the module pins.

The probe assembly 34 further includes a dielectric base 44 fixed to a dielectric guideway 48 in which the base sections 38 of the contact fingers 36 are inserted and retained in their desired formation. A pair of dielectric retainer plates 46, fixed to the base 44, have narrow slots therein which engage the flattened intermediate sections 40 of the contact fingers 36 so as to prevent the fingers 36 from rotating and being accidentally extracted.

When a module is situated at the testing station S, the module has entered the lower portion of the entry chute 26 which constitutes a ribbed and furrowed guideway 48 that can be a separate element. More specifically, and as best seen in FIGS. 4 and 6—9, the guideway 48 comprises a plurality of elongated ribs 49 which define between them and the side walls of the guideway a plurality of furrows 50. The ribs 49 are tipped at their leading edges 52 so that the pins of the modules will be guided further downward and will not be caught at this point. Each furrow 50 is of a width sufficient to permit a module pin to pass in it, while each rib 49 is sufficiently thin so that a pair of module pins can pass on opposed sides thereof without interference. There are as many furrows as there are lines of pins, while the number of full ribs is one less than the number of pins (see FIGS. 8 and 9).

The contact fingers 36 are held so that their tips 42 are situated in an array of wells 54 formed in the guideway 48, the wells passing through the guideway in a direction from the base 44 toward the top edges of the ribs 48, but stopping somewhat short of these top edges, thus achieving continuity of pin guide surfaces. The aforesaid wells are positioned so that they open toward the furrows 50, as best seen in FIGS. 6—9. The wells 54 and the tips 42 of the contact fingers are arranged and are of dimensions such that when the finger tips are completely withdrawn into said wells, they are removed from the furrows, so as not to prevent movement of the pins of the modules along the furrows 50.

The probe assembly 34 further includes means for shifting the contact fingers 36, and specifically the tips 42 from an initial intermediate "at-rest" position and between a position out of contact with the pins and out of the furrows 50, and a position in physical contact with the pins and extended into the furrows 50. Said means includes a plate 56 which reciprocates with respect to the base 44 on Teflon pads 58. The plate 56 is driven in its reciprocating movement by a bidirectional solenoid drive 60 connected to the plate 56 by an arm 61. The plate 56 and a pair of sockets 64 define a chamber for a plurality of dielectric spacing rods 62. Each pair of rods 62 pass on either side of a file of contact fingers 36 at the intermediate portions 40 thereof. Hence, as the plate 56 is reciprocated, it in turn causes the rods 62 to be driven laterally and roll which causes the tips 42 of the fingers to move into the wells (FIG. 8) or out of the wells and into the furrows 50 (FIG. 9) as desired. It will be evident that the contact fingers engage the pins at substantially one point only on each pin and under zero-insertion force. As can best be seen from FIG. 9, when the tips 42 of the contact fingers engage the pins, they attempt to shift the module to a small degree in a direction parallel to their movement. This shifting of the module can take place to a small extent until the sides of the pins opposed to the sides at which they are engaged by the tips 42 contact the opposed side walls of the ribs 48, which prevent further movement. These side walls of the ribs 48 thus act as anvils to stop further movement of the pins, to enable solid physical contact between the tips 42 and the pins, and to prevent the pins from bending to any significant degree, which might cause their misalignment.

At the testing station, there is a photocell sensing system P shown symbolically in FIG. 4. A lamp is provided at one side of guideway 48 in the region of the testing station, and a photocell detector is disposed at the opposite side of the guideway. The sensing system detects the entry of a new module into the testing station. After allowing the module to settle, the photocell output is used to control engagement of the probe fingers with the module pins at the start of a test.

The apparatus 10 further includes means for transporting a module from the testing station S, after it has been tested, to a sorting station R. Said transporting means includes an exit chute 66, similar in internal configuration to the entry chute 26, which leads from the testing station S to the sorting station R, and means for retracting the stop 32 and for permitting, upon such retraction, only a single module to pass down the chute 66. Said means includes a rocker assembly 68 (see FIGS. 3 and 4) driven by a solenoid drive 70. The rocker assembly 68 includes a rocker bar 72 mounted for limited rotational movement on a shaft 74. One side of the rocker bar is attached by a rod 76 to the stop 32, so that when the rocker bar rotates on its shaft 74, the rod 76 withdraws the stop 32 from the chute 26. The rocker bar is connected by an arm 78 to the solenoid drive 70. The side of the rocker bar 72 opposed to the side which acts upon the stop 32 carries a brake 80. The brake 80 includes a shaft 82 which extends from the rocker bar 72 toward the guideway 48, and a rubber head 84 on the end of said shaft 82. When the rocker arm 78 is rotated by the solenoid drive 70, the stop 32 is withdrawn and the rocker arm acts to force the brake 80 into binding contact with the cap of a module in alignment with it, thereby forcing the module against the floor of the guideway. By so doing, module $M_1$ (see FIG. 4) is permitted to drop past the stop 32, while the module $M_2$ is temporarily held in place. When the solenoid drive 70 then releases, the stop 32 moves back into place and the brake 80 releases the module $M_2$, permitting said module to drop further until it engages the stop.

Figure 13:
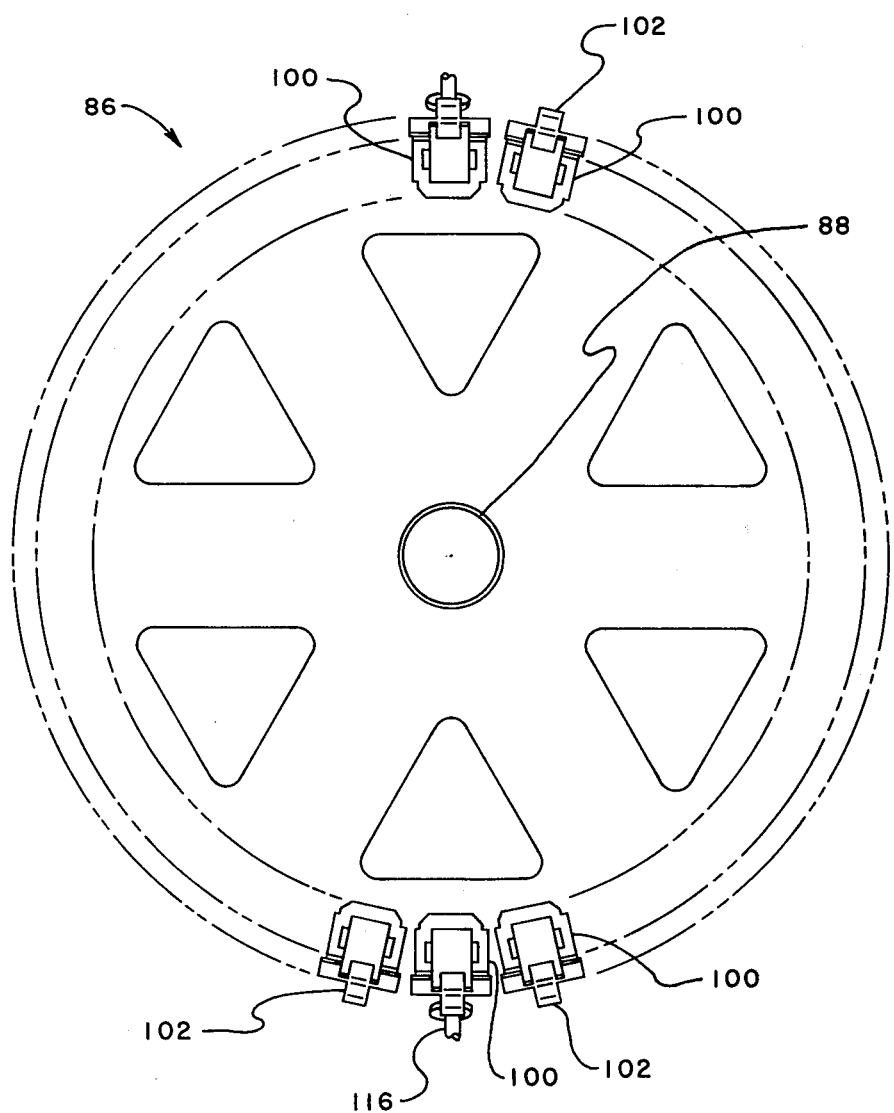
FIG. 13 is a top plan view of the index wheel carrying its buckets.

As mentioned, the transporting means moves modules, subsequent to their testing, from the testing station S to the sorting station R by enabling the modules to slide down the exit chute 66. From the sorting station, means deposits the modules to one of a number of different bins dependent upon the results of the testing. Said depositing means includes an index wheel 86 (see FIGS. 1, 2 and 13) mounted for rotation about a vertical axis on a shaft 88. The index wheel is rotated, interruptedly, upon a command signal. A drive 90 for the index wheel includes a continuously operating small horsepower motor 92 and a clutch 94, whose output shaft via a gear train periodically drives the index wheel 86 in a well-known manner. The index wheel drive 90 drives the index wheel through an angle of rotation which is the same as the angle between the centers of any two adjacent buckets.

Figure 10:
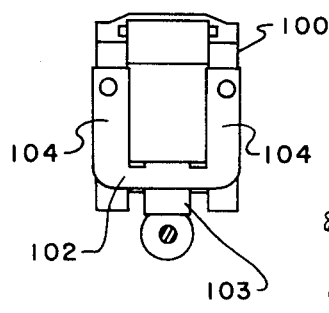
FIG. 10 is a front elevational view of an index wheel bucket.
Figure 11:
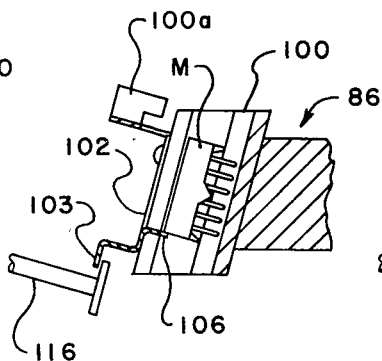
FIGS. 11 and 12 are cross-sectional views of a bucket, showing the jaw thereof in closed and open positions, respectively.
Figure 12:
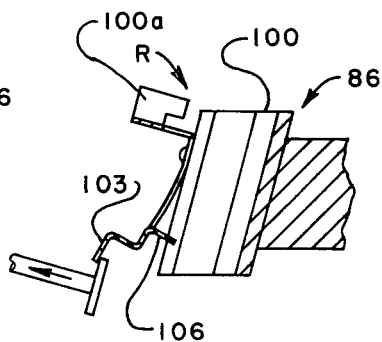

The index wheel carries, at its circumference, a plurality of module buckets 100 through a path of rotation such that each bucket in turn passes in alignment immediately below the lower end of the exit chute 66 (see FIG. 2). Each bucket, as best seen in FIGS. 10—12, has an internal configuration essentially identical to the internal configuration of the chutes 26, 66, so that a module dropping down the chute 66 is received in a bucket 100 in alignment with it.

Each bucket has a jaw 102, of U-shaped configuration, which includes a pair of arms 104, each of which is fixed to a different side of the bucket. The jaw further includes an internally protruding tab 106 which extends into the bucket to act as a floor for the bucket to prevent a module passing into the bucket from continuing downwardly through it. The jaw is formed from spring metal and is biased to a closed position as shown in FIG. 11.

A number of module receiving bins 108 are situated at lower portions of the frame 14, and are generally disposed thereon below the path of rotation of the buckets 100. One such bin 108a is disposed in alignment with and immediately below the chute 66. Another such receiving bin 108b is disposed on the rear of the frame, 180° away from the receiving receptacle 108a.

Each of the bins 108 is intended to receive a module of a different standard. For example, bin 108a will receive modules which are electrically up to a desired standard, while the receiving receptacle 108b will receive modules which fall below the aforesaid standard. The aforesaid depositing means, in connection with the index wheel 86 already described, determines into which of these bins a module will be placed. For this purpose, a solenoid 114 is provided and includes a headed shaft 116 (see FIG. 11) which engages an extension 103 of any bucket 100 which is in alignment with it. The extensions 103 are so situated that they are engaged by the headed shaft 116, when a bucket is immediately above a receiving receptacle 108.

Solenoid 114 is normally energized so that falling modules can go through the bucket under chute 66 and be collected in bin 108a. Should the tester determine that a particular module at the testing station S meets certain electrical standards, it leaves the solenoid energized, keeping the jaw 102 away from the bucket 100, removing the floor from the bucket, and enabling the module to drop directly into the module receiving receptacle bin 108a.

Should the tester T determine that the module in the testing station S does not meet the aforesaid electrical standards, a signal is sent to the solenoid 114 to release it, so that when the module reaches the bucket, it will remain in it, movement through said bucket being inhibited by the presence of the floor 106. The tester also sends an appropriate signal to the index wheel drive 90 causing said drive to rotate the index wheel so that the next successive bucket 100 comes into alignment immediately beneath the exit chute 66. Photoelectric sensor 100A located at the bottom of the chute 66 serves to delay the indexing of wheel 86 until the module is in the bucket.

Another solenoid 126 similar to the solenoid 114, together with a headed shaft is situated at the rear of the frame 14, immediately above the receiving bin 108b. The tester energizes this solenoid whenever the index wheel completes a single index. When a module, having been carried by a bucket of the index wheel, reaches this location immediately above said bin 108b, it drops into the bin where solenoid 126 is energized.

Having now described the structural details of the apparatus, it will be advantageous from the point of view of clarity, to briefly review the steps carried out by the module tester and sorter 10. Modules M are placed into the loading chute 22, in a manner such that they drop into and fill the entry chute 26, further downward movement of the modules being prevented by the stop 32 situated in the guideway 48 at the testing station S.

The probe assembly 34 is then operated by virtue of the solenoid drive 60 reciprocating the plate 56, to shift the contact fingers 36 from a location within the wells 54 in a direction transverse of the pins and into contact with the pins of the module undergoing testing. The tester connected to the fingers 36 tests the module, to determine its electrical characteristics. When this has been carried out, the solenoid drive 60 returns contacts to wells, the solenoid 70 operates, withdrawing the stop 32, permitting the bottommost module to slide downwardly, along the exit chute 66 and simultaneously the same solenoid operates the brake 80 to hold the next successive module temporarily in place.

As the tested module is sliding down the chute 66, if the module just tested is of certain standards, the tester allows the solenoid 114 to remain energized, causing the jaw 102 of bucket 100 in alignment with the chute 66 to remain open, permitting the descending module to pass through the bucket and into the receiving bin 108a. On the other hand, if the tester has determined that the module is below standards, a signal is transmitted to release the solenoid, and the module is caught in the bucket by the floor 106 of the jaw 102. Also, the tester sends a signal to the index wheel drive 90, which in turn rotates the shaft 88 of the index wheel 86, causing the next bucket 100, which is empty, to rotate through a small angle into alignment below exit chute 66.

In the same manner, the system continues testing one module after the other, and causing them either to fall through the sorting station into the bin 108a, or to be received in successive buckets of the index wheel and subsequently to be deposited in bin 108b.

Figure 14:
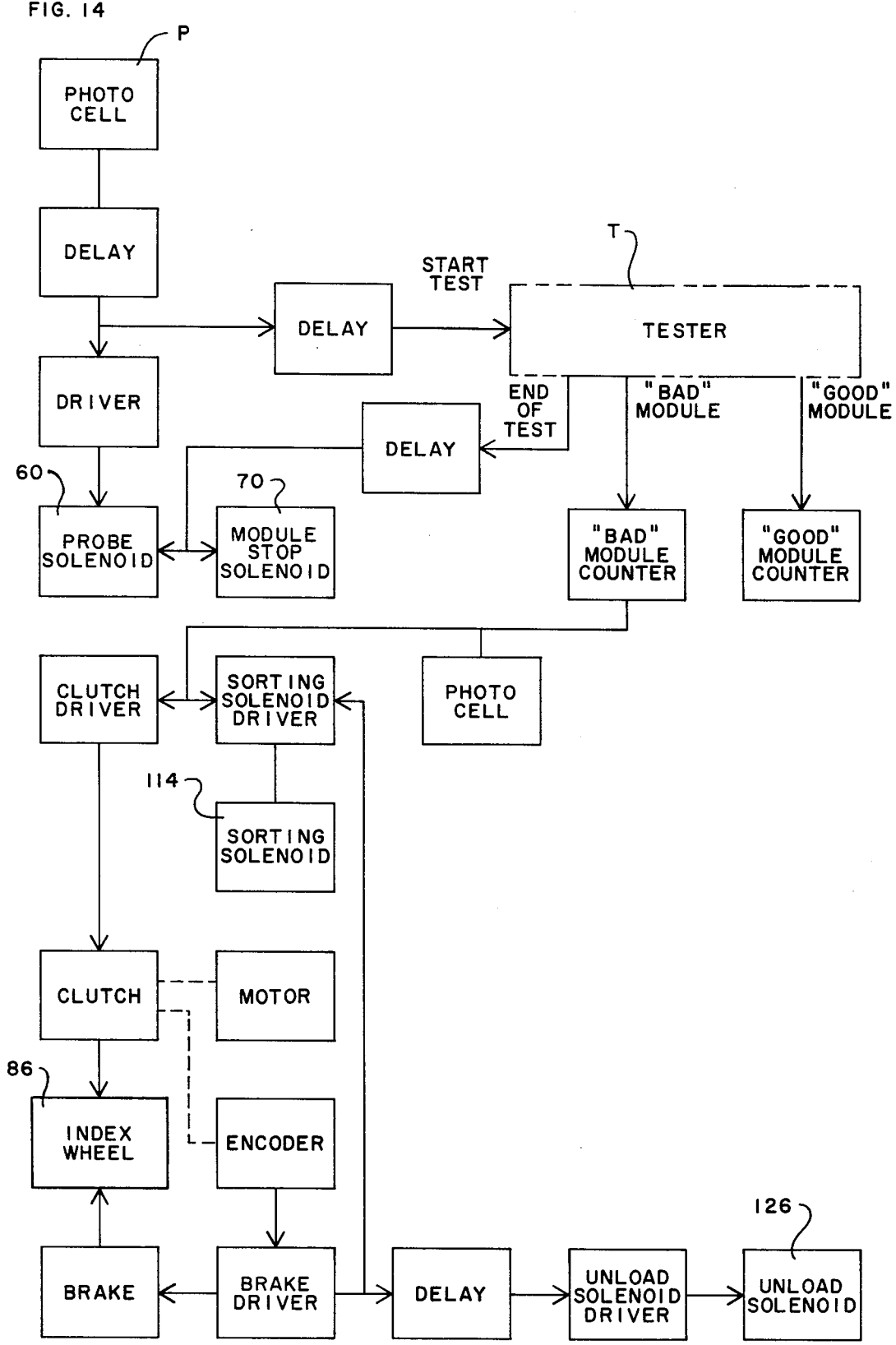
FIG. 14 is a schematic representation of a control system for the tester and sorter apparatus.

FIG. 14 is a schematic representation of a control system which can be used in the testing and sorting apparatus of the invention. The photocell sensor at the testing station detects the entry into the station of a new module. It is the initial blocking of the light from the detector which initiates a test sequence. After a suitable delay to allow the module to come to rest at the testing station, a current driver is operated to energize probe solenoid drive 60. This causes the probe fingers to engage the module pins. After another short delay (sufficient to allow the finger-pin contact to take place), the test is started.

If the module is determined to be "good", the "good" module counter is incremented. The tester transmits an "end of test" signal through a delay to both probe solenoid drive 60 and module stop solenoid 70. The signal transmitted to the probe solenoid causes it to release so that the probe fingers disengage themselves from the module pins. The signal transmitted to the module stop solenoid causes it to operate momentarily to release the module just tested and to hold the next module above it in place. The released module falls through the bucket at the bottom of chute 66 inasmuch as sorting solenoid 114 remains energized. Upon the release of module stop solenoid 70, the next module falls into the testing station. As soon as it is sensed by photocell P, another test sequence takes place.

On the other hand, if the module is determined to be defective, a "bad" module counter is incremented. After the counter is incremented, a pulse is transmitted to both a clutch driver and a driver for the sorting solenoid. When the latter driver operates, sorting solenoid 114 is de-energized (the solenoid is normally energized). The bucket jaw 102 at the bottom of chute 66 closes and the module which falls down the chute is captured in the bucket. The purpose of the delay interposed between the "end of test" signal and solenoid drive 60 and 70 is to allow sorting solenoid 114 to de-energize before the "bad" module just tested is released.

The clutch driver, when operated, energizes a clutch which couples motion from a continuously operating motor to the index wheel. The index wheel starts to turn, but it is necessary that it turn an amount only sufficient to allow the next bucket to be moved under chute 66. An encoder, electrically coupled to the clutch, determines when the index wheel has been rotated sufficiently. When this condition is detected, a brake driver is operated. The brake driver causes a brake to stop further rotation of the index wheel.

The brake driver also controls two other functions when it operates. First, it causes the sorting solenoid driver to turn on as soon as the pulse from the "bad" module counter terminates. This is necessary in order that solenoid 114 be energized once again in the event the next module to be tested is determined to be satisfactory. The second function performed at this time is to energize an unload solenoid driver, which in turn energizes unload solenoid 126. Since a "bad" module has been detected and the index wheel has been rotated to its next position, it is apparent that a bucket containing a "bad" module is moved to a position over bin 108b. With the operation of the unload solenoid (whenever a "bad" module is detected and the index wheel is rotated), the bucket is unloaded and is therefore prepared to receive another defective module.

Although the invention has been described with reference to a particular embodiment, it is to be understood that this embodiment is merely illustrative of the application of the principles of the invention. For example, it is possible to provide several bins disposed around the index wheel to collect modules of different categories. All that is required in such a case is to provide an unload solenoid for each bin and to have the tester control the operation of the individual unload solenoids when buckets containing modules of the appropriate categories are disposed above the respective bins. Thus, it is to be understood that numerous modifications may be made in the illustrative embodiment of the invention and other arrangements may be devised without departing from the spirit and scope of the invention.

What is claimed is:

1. Apparatus for testing and sorting modules into module-receiving bins comprising a frame carrying a downwardly-inclined chute configured to receive the modules in file orientation, a test station on said chute, said test station including means for testing the modules to determine certain electrical characteristics thereof as they pass through the test station, a sorting station carried by the frame below the test station and in alignment with the chute, a wheel carrying a number of module-receiving buckets rotatably mounted on the frame, drive means for rotating the wheel so that the buckets stop one after the other at the sorting station and indexing the wheel only when a module is received by a bucket located at the sorting station, said sorting station including sorting means responsive to said testing means for passing modules with certain electrical characteristics through a bucket at the sorting station and into a bin and temporarily retaining modules with other characteristics in the buckets for deposit in another bin, each bucket includes a jaw, the sorting means including means for opening the jaw of a bucket located at the sorting station to enable a module to pass through said bucket.

2. Apparatus for testing and sorting modules as set forth in claim 1 wherein each of the buckets has a spring member biasing its jaw to a closed position.

3. Apparatus for testing and sorting modules as set forth in claim 2 wherein each jaw carries a floor which protrudes into the chute.

4. Apparatus for testing and sorting modules as set forth in claim 2 wherein the sorting means further comprises a number of solenoid drives carried by the frame, circumferentially spaced about the path of rotation of the wheel, each said drive including an arm for engaging a jaw of a bucket in alignment therewith, a module-receiving bin being situated in alignment below each solenoid drive.

5. Apparatus for testing and sorting modules into module-receiving bins comprising a frame carrying a downwardly-inclined chute configured to receive the modules in file orientation, a test station on said chute, said test station including means for testing the modules to determine certain electrical characteristics thereof as they pass through the test station, a sorting station carried by the frame below the test station and in alignment with the chute, a wheel carrying a number of module-receiving buckets rotatably mounted on the frame, drive means for rotating the wheel so that the buckets stop one after the other at the sorting station and indexing the wheel only when a module is received by a bucket located at the sorting station, said sorting station including sorting means responsive to said testing means for passing modules with certain electrical characteristics through a bucket at the sorting station and into a bin and temporarily retaining modules with other characteristics in the buckets for deposit in another bin, the testing means includes a probe assembly having an array of contact fingers, and means for shifting said fingers in a direction transverse of the chute and into contact with a module at the testing station.

6. Apparatus for testing and sorting modules as set forth in claim 5, the modules comprising memory modules with a set of contact pins, and wherein the array of contact fingers is complementary to the array of pins of the module.

7. Apparatus for testing and sorting modules as set forth in claim 6, further including stop means for retaining one module at a time, at the testing station.

* * * * *